United States Patent

[11] 3,593,077

[72] Inventor Richard C. Loshbough
 Toledo, Ohio
[21] Appl. No. 767,276
[22] Filed Oct. 14, 1968
 Division of Ser. No. 373,136, June 4, 1964,
 Pat. No. 3,435,916
[45] Patented July 13, 1971
[73] Assignee Reliance Electric Company
 Euclid, Ohio

[54] ELECTRICAL CIRCUIT FOR PULSE FED INDUCTIVE LOAD
 6 Claims, 19 Drawing Figs.
[52] U.S. Cl.............................................. 318/158,
 318/257, 318/293, 318/300, 318/341
[51] Int. Cl........................................... H02p 5/24,
 H02p 7/24
[50] Field of Search........................... 318/146,
 158, 341, 356, 345, 257, 293, 294, 300

[56] References Cited
 UNITED STATES PATENTS
 3,176,212  3/1965  DePuy...................... 321/18
 3,191,112  6/1965  Cain........................ 321/18
 3,219,908  11/1965  Zarleng..................... 318/294 UX
 3,233,161  2/1966  Sikorra..................... 318/257
 3,332,000  7/1967  Greening................... 318/345
 3,411,063  11/1968  Schoonover................. 318/345
 3,432,740  3/1969  Morgan..................... 321/43
 3,170,104  2/1965  Richards................... 318/146
 3,184,670  5/1965  Reynolds................... 318/356
 3,302,089  1/1967  Rosa et al................. 318/356
 3,355,640  11/1967  Lewis et al................ 318/341
 3,358,204  12/1967  Bradley.................... 318/331

OTHER REFERENCES
ELECTRONIC AND RADIO ENGINEERING by F. E. Term Pub. by. McGraw Hill 4th Edition 1955 Pages 721 and 723 (2 copies attached)

Primary Examiner—Oris L. Rader
Assistant Examiner—K. L. Crosson
Attorney—Wilson and Fraser ABSTRACT: A circuit for applying current pulsations of opposed polarity to an inductive load wherein the net current in the load is the difference in the magnitude of the pulsations. A capacitance is connected across the inductive load to permit the buildup of a net current. Circulating currents in the capacitance can be restricted by inductance or resistance in series between the source of pulsations and the capacitance.

INVENTOR.
RICHARD C. LOSHBOUGH

BY
Wilson & Fraser
attorneys

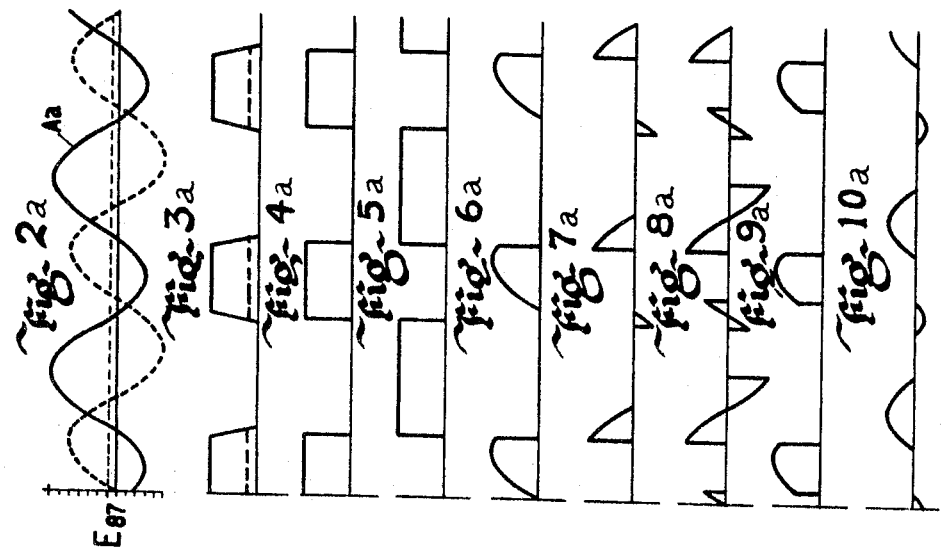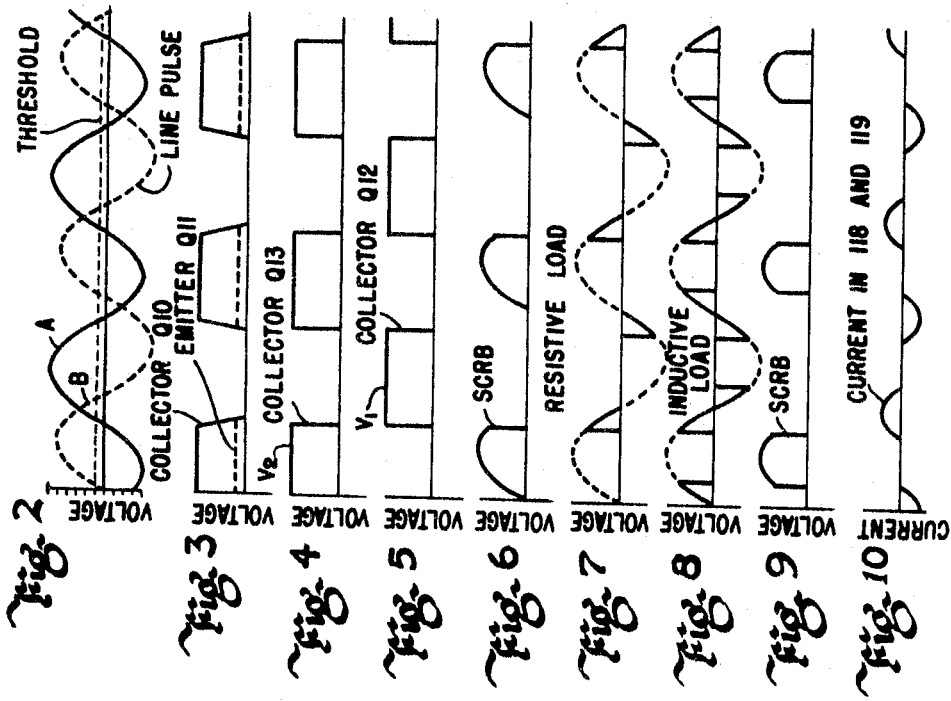

ELECTRICAL CIRCUIT FOR PULSE FED INDUCTIVE LOAD

CROSS-REFERENCES TO RELATED APPLICATIONS

This application is a division of application SER. No. 373,136 filed June 4, 1964 in the names of Robert E. Bell, Donivan L. Hall and Richard C. Loshbough, now U.S. Pat. No. 3,435,916 which issued Apr. 1, 1969 and is entitled "Elevator Motor Speed Control Including High Gain Forward Loop and Lag-Lead Compensation." It is related to an application in the names of Donivan L. Hall and Richard C. Loshbough entitled "Safety Circuits for Elevator Motor Speed Control Including Negative Feedback in a High Gain Closed Loop" Ser. No. 758,776 filed Sept. 10, 1968.

SUMMARY OF THE INVENTION

This invention relates to electrical circuits for transmitting substantial amounts of power to inductive loads and is illustrated particularly by a controlled rectifier source producing electrical pulsations of opposed polarity and of a controllable magnitude for each polarity to apply a net current to a shunt field of a dynamoelectric generator controlling a motor.

An object of the invention is to improve the efficiency of application of bidirectional pulsations of current to a highly inductive load to develop a net current therein.

A more specific object is to avoid resistive losses due to high currents while permitting such currents to build in an inductive load.

A third object is to enable electrical pulses of opposite polarity and of controlled magnitude to be employed in the production of a net input of a given polarity to an inductive load.

In accordance with the above objects one feature of this invention resides in a source of electrical energy supplying a highly inductive load comprising oppositely connected controlled rectifiers having control gates arranged to place their respective rectifiers in conduction at the same point in the half cycle they are biased forwardly and thereby impose a net zero energy when no input signal is applied and arranged to increase the phase angle for firing one rectifier while reducing that for the other to produce useful net energy corresponding to the difference in the pulsations. A capacitance connected across the inductive load permits the net energy to buildup in the load.

Another feature, particularly applicable where higher levels of power are required, involves an inductance connected in series with said capacitance between the sources of pulsating energy and the capacitance to reduce the surge current in the capacitance.

A further feature resides in a controlled rectifier supply to the generator shunt field of a Ward Leonard system wherein capacitance is connected across the highly inductive field to avoid the inductive limiting effects on the rectifier supply. Excessive power dissipation as might be experienced with a damping resistance is avoided by the capacitance. The surge currents in the circuit are limited by including an inductance in series with the capacitance across the inductive load.

DESCRIPTION OF THE DRAWINGS

The above and additional objects and features of this invention will be appreciated more fully from the following detailed description when read with reference to the accompanying drawings in which:

FIG. 2 through FIG. 10 are waveforms of the signals appearing at various points in the firing circuit and output of the phase controlled, controlled rectifier source supplying the shunt field of the generator supplying the motor of FIG. 1, the signals representing those present when a zero input signal is applied to the circuit; and FIGS. 2a through 10a are waveforms of the signals appearing at the same point as for FIGS. 2 through 10 respectively when a positive error signal is applied to the input of the circuit.

DETAILED DESCRIPTION OF THE PREFERRED EMBODIMENT

Figure 1:
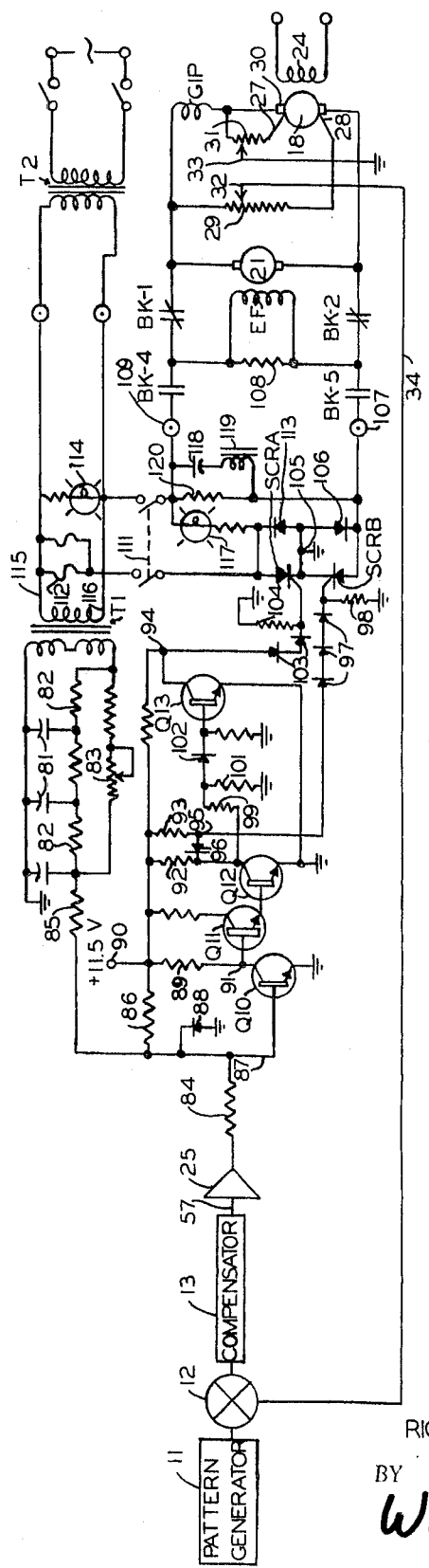
FIG. 1 is a diagram of a servocontrol including a block representation of a pattern generator, summing point, compensator and amplifier with a schematic of a speed signal feedback circuit from a motor controlled in a Ward Leonard system having a controlled rectifier supply to the generator shunt field and a controlled phase firing circuit for the rectifier gates.

The invention has been applied to elevator hoist motor controls wherein the armature 18 of the hoist motor is supplied with a variable voltage from a generator armature 21 driven by a motor (not shown), and the generator output is controlled by control of its shunt field EF. The hoist motor shunt field 24 can be supplied from a suitable source (not shown) either at a constant current level or levels controlled for torque or speed considerations in a manner well known in the elevator art. Controlled rectifiers SCRA and SCRB connected with opposite polarity supply the generator shunt field by applying thereto portions of an AC supply as pulses effective during the half cycle each is forward biased. A phase control firing circuit is connected to the gates of SCRA and SCRB to cause greater conduction in one and less conduction in the other so that the controlled pulses of opposite polarity result in a net current of the dominant polarity in the load EF.

It is to be understood that other sources of pulses of opposed polarity and other loads can be utilized without departing from the spirit and scope of this invention and that the generator shunt field and the SCR sources are merely illustrative of the invention.

As shown in FIG. 1 a pattern generator 11, which can be a velocity pattern based on time for a hoist motor, provides the controlling signal. The generator can produce a voltage scaled to velocity and of a form along the time axis which gradually increases from zero velocity, following a start signal, to a maximum acceleration, maintains a constant maximum acceleration until it can make the transition to maximum rated velocity smoothly and then gradually reduces the acceleration to zero at maximum velocity. The run of the elevator at maximum velocity is dictated by a flat pattern signal from generator 11 until slowdown is initiated. A gradual transition to a constant slope scaled to the maximum deceleration commanded of the elevator begins in the pattern at slowdown and continues until zero velocity is approached at which time a signal for the gradual transition between the maximum deceleration and zero velocity is generated.

The pattern signal is combined at summing point 12 with a hoist motor speed signal derived from feedback lead 34 to produce a speed error signal representing the difference between the pattern speed commanded and the actual elevator or hoist motor speed. This error signal is then fed through a compensating network, compensator 13, which adjusts both the phase and magnitude of the signal to permit an increase in the gain and the bandwidth of the system within which it will operate without instability.

A high gain buffer amplifier 25, one having a gain from 50 to 100, applies the compensated speed error signal to a phase control firing circuit for the controlled rectifiers SCRA and SCRB to determine the voltage level applied by the generator 21 to the armature 18 of the hoist motor.

In the illustrative example the amplified and compensated velocity error signal controls the phase of a firing circuit for a pair of controlled rectifiers connected with like polarity electrodes each connected to one of the two terminals of a single phase alternating current source. These rectifiers are triggered, for zero signal input to their firing circuit, by an alternating current shifted 135° from the line phase so that they are each conductive a like period and the net DC derived therefrom is zero. Changes in this supply to the load are achieved by raising or lowering the base of the firing signal to increase the conduction interval in one rectifier over that in the other for a first polarity of pulsating unidirectional current and to reserve that relationship for the opposite polarity when the base of the signal is shifted to the other side of the zero signal level.

The speed signal is derived from a bridge arrangement as disclosed in Robert O. Bradley U.S. Pat. application Ser. No. 368,623 which was filed May 19, 1964 and is entitled "Motor Speed Control" now U.S. Pat. No. 3,358,204 which issued Dec. 12, 1967. This arrangement provides a voltage proportional to the e.m.f. generated in the motor, and thus the motor speed, while eliminating the effects of brush drop and armature current on that voltage. It involves providing pilot brushes 27 and 28 on motor armature 18. A potentiometer 29 is connected across the generator interpole winding GIP, one main brush 30 of the motor and the motor armature 18 to pilot brush 28. A second potentiometer 31 is connected from pilot brush 27 across main brush 30. With the taps 32 and 33 of potentiometers 29 and 31 set so that the resistance of their upper portions is related to the resistance of their lower portions in the same proportion as the external resistance provided by the generator interpole windings GIP is related to the motor armature resistance, the voltage developed between taps 32 and 33 is proportional to the speed voltage of the motor. In the example tap 33 is grounded and tap 32 is connected through lead 34 to summing point 12.

The resulting error signal from summing point 12 is to fed to compensator 13. The output of the compensator is connected by lead 57 to the input of direct current amplifier 25. This amplifier may be stabilized by negative feedback with parameters providing the desired amplifier gain.

The firing circuit of the controlled rectifiers is based upon a displacement of the firing wave from the applied line wave so that a pair of back to back rectifiers are fired symmetrically to produce no net current at zero signal and are fired assymmetrically to apply either a positive or negative net current on the generator shunt field EF depending upon the direction of the shift in firing angle.

Transformers T1 and T2 are each driven from the same line voltage so that their inputs are in phase. The output of transformer T1 is phase shifted 135° by the three, cascaded, phase shifting networks each comprising a condenser 81 and a resistor 82. Exact adjustment of this shift is obtained by means of potentiometer 83. This voltage is summed with the output of the amplifier 25 in the summing network of resistors 84 and 85. Resistor 86 connected from terminal 90 of a highly regulated positive source of direct current (not shown) to lead 87 and the base of transistor Q10 offsets any threshold voltage of Q10.

In considering the firing circuit two sets of waveforms will be considered in FIGS. 2 through 10. The first set represents the signals at various points in the circuit when zero input is applied at lead 57. The second represents the signals at corresponding points when a positive input or error signal exists. The second set will be distinguished by a lower case $a$.

The waveform across the resistor 85, which is applied on lead 87 in a form modified by the clamping action of diode 88 and the base-emitter diode of transistor Q10 to the base of Q10 with no output from amplifier 25, is shown as a sine wave A shifted 135° from line sine wave B and having its origin shifted as shown in FIG. 2. The waveform at the collector of Q10 is shown in FIG. 3. Excessive reverse bias on Q10 from the AC signal on 87 is avoided by the diode 88 which passes negative signals above its threshold to ground. When the applied voltage reaches the threshold voltage of Q10, the transistor begins conducting current and the drop in resistor 89 causes the collector voltage to drop at junction 91. The collector wave form corresponds to the input until the transistor becomes saturated and the curve flats.

Transistor Q11 is an emitter-follower whose emitter voltage would correspond to the signal at junction 91 but for the clamping action of the base-emitter diode of transistor Q12. The dashed line in FIG. 3 is the emitter waveform of Q11.

The collector wave of Q12 is shown in FIG. 5, and the waveform of Q13 is shown in FIG. 4. Transistors Q12 and Q13 and their associated circuitry constitute a Schmitt trigger wherein the triggering signal is developed at junction 91. When zero signal is present at 91, transistor Q13 is conductive and transistor Q12 is held off.

As the base of Q12 goes positive with the emitter of Q11, collector Q12 draws current through resistors 92 and 93 reducing the voltage on base Q13 below its sustaining level and terminating conduction in Q13 whereby its collector voltage rises at junction 94. The increased voltage on the control electrode of silicon controlled rectifier SCRA causes that rectifier to conduct when its applied anode-cathode voltage from transformer T2 is in the forward direction. At this time the voltage at junction 95 is the forward drop of diode 96 above ground and, in view of the forward drop of diodes 97, the voltage on the control electrode of SCRB is brought to ground through resistor 98 to enable its conduction to be terminated.

When the base of Q12 returns to ground, it is cut off and the voltage at the collector of Q12 rises. This voltage is applied through the voltage divider of resistors 99 and 101, and diode 102 to the base of Q13 so that it initiates conduction. The voltage at junction 94 falls below the threshold of diodes 103 so that the control electrode of SCRA is grounded through resistor 104. At this time the potential at junction 95 has risen so that when it exceeds the threshold of diodes 97 the control electrode of SCRB is driven positive beyond its threshold of conduction to enable SCRB to fire.

The collector signals of Q13 and Q12 as shown in FIGS. 4 and 5 are at levels V2 and V1 determined by the conduction drop of the gates of SCRA and SCRB and the threshold voltages of the diodes 103 and 97 in the collector circuits. The voltage in series with the SCR's and load is in phase with the line supplying the primary of T2. If the load were resistive, the voltage across SCRB is shown in FIG. 6 while that across SCRA would be similar for the other half cycle. The resulting waveform across a resistive load would appear as in FIG. 7.

The circuit for SCRA would extend from grounded junction 105 through rectifier 106, junction 107, brake relay contact BK-5, resistor 108, relay contact BK-4, junction 109, closed "-power" switch 111, the secondary of transformer T2, fuses 112, switch 111, SCRA and junction 105. Elevator brake relay BK (not shown) controls contacts BK-4 and BK-5 to connect the SCRs to field EF when the elevator is set to run and to establish the suicide circuit through back contacts BK-1 and BK-2 when the elevator is stopped and relay BK is deenergized. The corresponding circuit for SCRB is traced through rectifier 113. It should be noted that pilot lamp 114 is connected across the secondary of transformer T2 to indicate power is applied to the firing circuit at terminals 115 and 116 connected to T1 and to the SCR circuit. When the generator field power is on, pilot lamp 117 is illuminate.

The true load on the SCR's is the highly inductive generator field EF and the resistor 108 is significant only when the generator suicide connections are made to permit the decay of the field. This inductive load imposes limits upon pulsating current so that virtually no DC flux could be developed in the field winding alone. However, circulating currents are permitted without any direct current loss by shunting field winding EF with a large capacitance 118, e.g. 1500 m.f. This arrangement is further enhanced in its operating characteristics, particularly with respect to the surge currents through SCRA and SCRB, by including a relatively low inductance 119 in series with the capacitance as a limiting means, e.g. 0.01 henry and 0.16 ohm. This L-C series circuit has substantial advantage over a shunting resistor of low value in that no DC power loss is incurred and the efficiency of the circuit is enhanced. Resistor 120 is of a relatively high value, e.g. 1000 ohms, and therefore passes negligible current to the applied signal. Its function is to provide a discharge path for the L-C circuit when the power is disconnected.

This approach has been applied to a 30KVA generator driving a motor in a system having a motor constant Kg of 43 volts/ampere, a generator shunt field resistance $R_f$ of 12 ohms, a generator field inductance $L_f$ of 6 henrys, a loop inductance $L_L$ of 0.0145 henry, a loop resistance $R_L$ of 0.175 ohm, and a motor constant $K_m$ of 30 Newton-meters/ampere. The elevator car has a capacity of 3,000 pounds, an empty car weight of 6100 pounds, and is counterweighted to 40 percent of rated capacity so that for full load operation the inertia J is 922 kilogram-meters 2/radian, and the torque is 3051 Newton-meters. The drum over which the hoisting cables are trained has a diameter of 30 inches.

As a result of the highly inductive load presented by field EF to the SCR's the current reaches its peak when the input voltage is zero. The SCR's do not turn off until the current goes to zero even if the impressed voltage has reversed sign. Therefore, the voltage across the inductive load of field EF is shown in FIG. 8. The voltage across SCRB for this load is shown in FIG. 9. A corresponding voltage is developed across SCRA for the other half cycle under this load.

The filter composed of capacitance 118 and inductance 119 employed to overcome the high impedance presented to pulsating voltages by field EF and to smooth the SCR outputs has a current form as shown in FIG. 10.

Since the areas under the curves of FIG. 10 representing flow in each direction for SCRA and SCRB and in the filter are equal the net or DC value is zero and the generator shunt error field EF receives zero input where the signal from amplifier 25 is zero.

A positive or negative signal from amplifier 25, indicating a velocity error signal, as it appears at summing point 12 will alter the firing circuit and produce a net DC input to the shunt field by shifting the phase of the firing signal. A positive signal indicative of a hoist motor speed less than the speed commanded when the commanded speed is plus, increases the conduction interval of SCRB while decreasing the conduction interval of SCRA. This change tends to change the generator voltage in a manner to increase the motor speed and decrease the error. Conversely, a negative signal at summing point 12 for the same command signal will decrease the conduction interval of SCRB while increasing that of SCRA. This will tend to retard the motor speed by reducing the current in the field EF to reduce or reverse the impressed voltage on the armature thereby decreasing the motor speed to tend to decrease the error.

If a positive voltage is present at summing point 12 the waveforms are as shown in FIGS. 2a through 10a. The firing circuit voltage waveform Aa is shifted positively as shown in FIG. 2a with the result that it achieves the threshold of Q10 earlier and sustains that threshold later to lengthen the interval of conduction for SCRB as shown in FIG. 5a and shorten the interval for SCRA as shown in FIG. 4a. The resulting change in the voltage applied to the field EF is shown in FIG. 8a. It will be noted that the flow in SCRB is substantially greater than in SCRA and a net current results causing a generator armature voltage which drives the motor 18. When the motor approaches the desired speed, so that the speed voltage on lead 34 balances the pattern voltage, the error signal approaches zero, the voltage of amplifier 25 is zero and the net DC into the fields is zero. Any change in motor speed results in a speed error signal which forces the motor back to its proper speed.

It is to be understood that a source other than the pair of controlled rectifiers SCRA and SCRB can be employed to issue pulses of a given polarity repetitively from one terminal, as at 107, and to issue pulses of that polarity repetitively from a second terminal, as at 109. The control of these pulses is such that one dominates over the other to produce a net current in the inductance. Inductive loads other than shunt field windings for a generator can be supplied from the source of pulses of opposite polarity connected thereacross by shunting the load with a capacitance.

A range of magnitudes of circuit elements can be employed. While the shunting capacitance 118 has been illustrated as of 1,500 microfarads for the shunt field of a 30KVA generator supplying the armature of a hoist motor it should be recognized that the size of the capacitance need only be large enough to supply the current required of the inductive load during the intervals of nonconduction of pulses from the source terminal issuing the dominant pulse. The current limiting means, choke 119, is also subject to a range of values determined by its inductive reactance at the frequence of application of pulses from the source relative to the capacitive reactance of capacitance 118 at that frequency. The choke adequately limits currents, particularly when the net output is near zero and both pulses are of equal or nearly equal and yet substantial magnitude, when it is more than twice the reactance of the capacitance. The dissipation of instantaneous currents in the inductive-capacitive path 119 and 118, as when the load is disconnected from the source, should be through a resistance 120 of sufficient value to avoid excessive power loss in normal operation. Accordingly, variations in the combinations employed to illustrate this invention fall within its spirit and scope.

I claim:

1. A hoist motor system for an elevator comprising a direct current hoist motor; an armature for said motor; a shunt field for said motor; means for energizing said shunt field; a direct current generator; an armature for said generator connected to said motor armature; a shunt field for said generator; means for generating a signal proportional to the speed of said motor; means for generating a speed command signal; means for combining said speed signal and said command signal to produce an error signal; a source of alternating current having two terminals; a pair of controlled rectifiers having like electrodes connected to the opposite terminals of said source, the electrodes of said rectifiers opposite said like electrodes being connected to a common point; a control electrode for each rectifier; means to periodically apply signals to said control electrodes of a magnitude and phase to initiate conduction in said rectifiers; means to control the magnitude of said signals to said control electrodes according to said error signal; said rectifiers passing current to the shunt field of said generator as unidirectional pulses of opposite polarity; a capacitance connected across said generator field to enable said pulses to build up the direct current flux in said generator; and an inductance connected in series with said capacitance to limit the pulsating current drawn through said rectifiers.

2. In combination a controlled source of electrical pulses, a first terminal for said source repetitively issuing pulses of a first polarity of a controlled magnitude, a second terminal for said source repetitively issuing pulses of said first polarity of a controlled magnitude, an inductive load for said source, means connecting said first and second terminals across said inductive load, a capacitance of a magnitude to supply the current required of said load during the intervals of nonconduction of pulses from the terminal issuing the pulses of greatest magnitude connected across said inductive load, and current limiting means in series with said capacitance across said load.

3. A combination according to claim 2 wherein said inductive load of about 6 henrys and said capacitance is of the order of 1,500 microfarads.

4. A combination according to claim 2 wherein said current limiting means is an inductance.

5. A combination according to claim 6 wherein said inductance has an inductive reactance at the frequency of application of said pulsations from said source of more than twice the capacitive reactance of said capacitance.

6. A combination according to claim 2 wherein said source comprises first and second controlled rectifiers each having a main anode and a main cathode-electrode, said first and second terminals are like main electrodes of said first and second controlled rectifiers respectively, said load is a shunt field of a dynamoelectric generator, and said current limiting means is an inductive reactance more than twice the capacitive reactance of said capacitance at the frequency of application of pulses from said source, and said combination includes a resistance across said capacitance and said current limiting means.

UNITED STATES PATENT OFFICE
CERTIFICATE OF CORRECTION

Patent No. 3,593,077          Dated July 13, 1971

Inventor(s) RICHARD C. LOSHBOUGH

It is certified that error appears in the above-identified patent and that said Letters Patent are hereby corrected as shown below:

Column 3, line 30, "to fed" should be -- fed to --.

Column 4, line 56, "illuminate" should be -- illuminated --.

Column 6, line 63, "6" should be -- 4 --.

Signed and sealed this 6th day of August 1974.

(SEAL)
Attest:

McCOY M. GIBSON, JR.
Attesting Officer

C. MARSHALL DANN
Commissioner of Patents